(12) United States Patent
Waheed et al.

(10) Patent No.: US 11,777,862 B2
(45) Date of Patent: Oct. 3, 2023

(54) METHOD OF RECEIVER WINDOW WIDENING AND AUTODRIFT CALCULATION USING PACKET TIMESTAMPING

(71) Applicant: NXP B.V., Eindhoven (NL)

(72) Inventors: Khurram Waheed, Austin, TX (US); Yaoqiao Li, Suzhou (CN)

(73) Assignee: NXP B.V., Eindhoven (NL)

( * ) Notice: Subject to any disclaimer, the term of this patent is extended or adjusted under 35 U.S.C. 154(b) by 127 days.

(21) Appl. No.: 17/504,794

(22) Filed: Oct. 19, 2021

(65) Prior Publication Data
US 2022/0278938 A1   Sep. 1, 2022

(30) Foreign Application Priority Data

Feb. 26, 2021   (CN) .......................... 202110222724.0

(51) Int. Cl.
*H04L 47/27* (2022.01)
*H04W 56/00* (2009.01)

(52) U.S. Cl.
CPC .......... *H04L 47/27* (2013.01); *H04W 56/001* (2013.01)

(58) Field of Classification Search
CPC ... H04W 84/18; H04W 56/00; H04W 56/001; H04W 56/0015; H04W 56/002; H04W 56/0025; H04W 56/003; H04W 56/0035; H04W 56/004; H04W 56/0045; H04W 56/005; H04W 8/005; H04W 40/005; H04W 52/0212; H04W 52/0216; H04W 52/0219; H04W 52/0225; H04W 52/0229; H04W 52/0287; H04W 52/029; H04W 52/0293; H04L 47/27; Y02D 30/70
See application file for complete search history.

(56) References Cited

U.S. PATENT DOCUMENTS

| | | |
|---|---|---|
| 7,031,696 B2 | 4/2006 | Gerrits et al. |
| 8,351,409 B2 | 1/2013 | Albert et al. |
| 8,848,848 B2 | 9/2014 | Nowshadi et al. |
| 9,398,534 B2 | 7/2016 | Berntsen et al. |

(Continued)

FOREIGN PATENT DOCUMENTS

| | | |
|---|---|---|
| CN | 110324810 A | 10/2019 |
| WO | 2017/030473 A1 | 2/2017 |

OTHER PUBLICATIONS

U.S. Appl. No. 17/184,035, filed Feb. 24, 2021.

*Primary Examiner* — Peter Chen (57) ABSTRACT

Disclosed is a method of operating a low power wireless receiver in which a radio is periodically operable for receive intervals with sleep intervals therebetween and comprising a sleep clock having a sleep clock accuracy. A first transmission or packet is received. Based on a start moment of the first received packet, and an expected interval between packets, a nominal start moment is determined to start the radio for a packet window until a nominal end moment, for receiving a second packet; the packet window duration is extended in dependence on an estimated drift based on the SCA to provide a widened window. A start moment of a second received packet is measured within the widened window. An actual drift is calculated, from the start moment of the second packet; and an actual start moment and an actual window duration is determined, for receiving a third packet, based on the actual drift.

14 Claims, 4 Drawing Sheets

(56) References Cited

U.S. PATENT DOCUMENTS

2010/0029230 A1* 2/2010 Linsky ................. H04L 7/10
455/130
2010/0303185 A1* 12/2010 Haartsen ........... H04W 52/0216
455/70
2015/0109978 A1* 4/2015 Berntsen ........... H04W 52/0229
370/311

* cited by examiner

METHOD OF RECEIVER WINDOW WIDENING AND AUTODRIFT CALCULATION USING PACKET TIMESTAMPING

FIELD

The present disclosure relates to communication between wireless peer devices, and in particular to low-power communication wherein the receiver device is at least partially powered down between packets.

BACKGROUND

For successful communication between two wireless peer devices, the receiving device needs to be ready to receive, when a packet is transmitted to it. In cellular and other communication infrastructures that provide a global time reference, this can be achieved through time synchronisation, which may be globally derived by all participating nodes independently, using the available global time reference. However, in some networks, a global clock or time reference may not always be available. In particular, in low-power, low duty cycle networks, such as personal area, wireless personal area, local area or neighbourhood area with configurations such as peer-topeer, star or mesh there may be timing drift between communications devices or network nodes during periods where a global time reference is either not available, or is not monitored by one or more of the devices. Nonlimiting examples of such ad hoc networks and protocols for communicating therein, to which the present disclosure may be relevant, are IEEE 802.15.4 based networks and Bluetooth including Bluetooth low energy (BLE), Zigbee, Thread, sub-GHz standardized and proprietary networks.

For networks in which a receiver is partially powered down, or placed into a deep sleep mode (DSM) between packets, and then is woken up at an appropriate time to receive a packet after predetermined interval, the problem of drift can be resolved by reducing the "sleep" time between expected packets, such that the receiver is "awake", and ready to receive prior to the time of expected arrival of the subsequent packet. In case of a negative drift, such that the subsequent packet arrives early, the receiver is available to receive the packet. In addition, the "awake" period during which the receiver is available to receive the next packet should be extended to pass the expected arrival time, in order to accommodate a positive drift situation in which the packet arrives late.

This concept is generally referred to as window widening.

A receiver device monitors the time interval between expected packets using a low-frequency sleep clock, which continues to operate even when the receiver is "sleep". Similarly, the transmitter may also go to sleep between transmissions, and rely on a sleep clock. Since keeping power-consumption to a minimum is important for low-power receivers and transmitters, the accuracy of the sleep clock may in general be poorer than the high frequency reference clocks used for tracking time during normal operation. The limited accuracy of the sleep clocks is referred to, for example, in the BLE protocol as sleep clock accuracy, SCA, and which terminology shall be used herein under although the present disclosure is not limited to any specific protocol. The SCA results in an expected worst-case drift in the timing between packets, which is referred to hereinunder as drift_set, and this may be calculated and used to determine the window widening—which generally will be symmetrical—or almost symmetrical—around the expected receive moments.

Such window widening significantly increases the duration for which the receiver must be awake, thus increasing power consumption. Furthermore, receiving multiple packets each with a timing drift therebetween can result in a rapid increase in the required window widening over time, exacerbating the power-consumption problem.

SUMMARY

According to a first aspect of the present disclosure, there is provided a method of operating a wireless receiver having a mode in which a radio is periodically operable for receive windows, Window, with sleep intervals, Tsleep, therebetween and comprising a sleep clock having a sleep clock accuracy, SCA, the method comprising; receiving a first transmission, which may be a first packet; based on a start moment of the first received transmission or packet, and an expected interval between packets, Tinterval, determining a nominal start moment to start the radio for a packet window until a nominal end moment, for receiving a second packet; extending the packet window duration in dependence on an estimated drift, drift_set, based on the SCA to provide a widened window; measuring a start moment of a second received packet within the widened window; calculating an actual drift, drift_real, from the start moment of the second packet; and determining an actual start moment to start the radio, and an actual window duration, for receiving a third packet, based on the actual drift. The mode may generally be referred to as a low-power mode.

Thus, according to this aspect, the worst case window widening is used for determining the start and duration of the awake period for the receiver device, between receiving a first packet (which ought may also referred to as an anchor packet) and the second packet. By measuring the moment (according to the sleep clock) when the second packet is actually received, relative to the time (again according to sleep clock) when the second packet is expected, and actual drift can be determined. Subsequent to this, in preparation for the third packet, the actual drift is used rather than the—worst case—estimated drift, to determine the amount of window widening required to ensure that the radio is awake for the third packet. Since the actual drift will be less than the worst case estimated drift, the window widening for the third packet may be will be less than that for the second packet, thus resulting in a power saving.

In one or more embodiments, for receiving the third packet, the actual window duration for receiving the third packet is extended from the packet window by a predetermined margin, Tmargin. Although theoretically the window duration should not need to be 20 wider than the packet window itself, in practice, the drift may vary slowly over time. Including a margin for error thus ensures that the complete packet may be received while the radio is operating. In one or more embodiments, the predetermined margin may be small and may even be zero.

In one or more embodiments, for receiving a third packet, the actual start moment to start the radio is earlier than that based on the actual drift by the predetermined margin, and the actual window duration is extended from the packet window by twice the predetermined margin. Ensuring the radio is started and ready to receive the packet, prior to the arrival time expected from the measures drift in the previous interval, may provide a safeguard against missing the start of the packets in the events of the drift varying negatively over time.

In one or more embodiments, the actual moment to start the radio for receiving the third packet is determined relative to an actual arrival moment of the second packet, Tarrive2, by:

$$Trxen3=Tarrive2+Tinterval+(Tsleep*drift\_real)-Tmargin,$$

Moreover, the actual window duration, Window_real may be determined by:

$$Window\_real=Window+2*Tmargin.$$

The radio may thereby readily calculate the required turn on time and duration. Thus, it will be seen that if drift_real is negative (i.e. the sleep clock is running fast), the receiver is enabled earlier (since (Tsleep*drift_real) would then be negative), than if drift_real is positive (i.e. the sleep clock is running slow), (since (Tsleep*drift_real) would then be positive). It will be appreciated, since the window or widened window is small relative to the interval between packets, in one or more embodiments an approximation may be applied whereby Tinterval=Tsleep. In other embodiments, Tsleep may be calculated by subtracting the receive window duration from Tinterval.

The present disclosure further addresses the situation of one or more missed or skipped packets. Thus, in one or more embodiments, wherein the third packet is not received, the method further comprises determining, for receiving a subsequent (N+2)th packet, an actual start moment Trxen(N) to start the radio, based on the N times the expected interval between packets less N times the actual drift and N times the predetermined margin, according to:

$$Trxen(N)=Tarrive2+N*(Tinterval+(Tsleep*drift\_real)-Tmargin).$$

Thus, for each subsequent missed package, the radio is turned on increasingly early (provided that drift_real is negative, or that Tmargin is greater than Tsleep*drift_real). However, the turn-on time advances only by (Tsleep*drift_real)–Tmargin for each missed packet, which is less than would be the case relying on the SCA alone.

In one or more such embodiments, wherein one or more packets are missed, the method further comprises determining, for receiving the (N+2)th packet, and an actual window duration of:

$$Window\_real=Window+2*N*Tmargin.$$

Since the margin for error is related to addressing only the variation over time of the drift, rather than the—generally much larger—drift itself, the time for which the radio must be operating and thus consuming a higher level of power is may be significantly reduced relative to conventional window widening.

In one or more embodiments, the method comprises, after first receiving a packet after missing at least a predetermined number of packets, operating the radio throughout the immediately subsequent widened window. Thereby, in the event that multiple packets are missed to the extent such that the timing based on the measured drift is no longer reliable, the receiver may be reset to use a wider window (corresponding to that used for the second packet mentioned). Alternatively, or in addition, in the event that the predetermined number of packets are missed, the receiver may be programmed to implement a full interrupt for instance to wake up the MCU or host processor.

In one or more embodiments, in order to start the radio, the method comprises waking up the radio at a moment which precedes the start moment by pre-determined warm-up interval. In practical limitations, the moments and durations above may be adapted so as to be based on so-called moments, being the moment at which the radio should start to wake up in order to be fully warmed up and properly operational in time to receive the preamble and then synchronisation bits or other SFD (start of frame data). In one or more embodiments, the expected interval between packets, Tinterval, is constant. In one or more other embodiments the expected interval between packets, internal, is variable. In one or more such embodiments, the expected interval between the second and third packet is given by Tinterval2, and the sleep time is given by Tsleep2 and wherein the actual moment to start the radio for receiving the third packet is determined relative to an actual arrival moment of the second packet, Tarrive2, by:

$$Trxen3=Tarrive2+Tinterval2+(Tsleep2*drift\_real)-Tmargin.$$

It will be appreciated, since the window or widened window is small relative to the interval between packets, in one or more embodiments an approximation may be applied whereby Tinterval2=Tsleep2. In other embodiments, Tsleep2 may be calculated by subtracting the receive window duration from Tinterval2. Furthermore, it will be appreciated that generally hereinabove, the first, second, and third packets refer to a sequence of packets, in which the second immediately follows the first, the third immediately follows the second, and so on. However, it will be noted that the present disclosure is not limited thereto.

According to a further aspect of the present disclosure, there is provided a wireless receiver comprising: a sleep clock having a sleep clock accuracy, SCA; a radio configured to be periodically operable to receive a packet during a receive interval and to have sleep intervals, Tsleep, therebetween; a calculation engine configured to: based on a start moment of a first received packet, and an expected interval between packets, Tinterval, determine a nominal start moment to start the radio for a packet window, Window, until a nominal end moment, for receiving a second packet; determine a widened window by extending the packet window duration in dependence on an estimated drift, drift_set, based on the SCA; and a clock circuit configured to measure a start moment of a second received packet within the widened window; wherein the calculation engine is further configured to calculate, from the start moment of the second packet, an actual drift, drift_real, and determine an actual start moment to start the radio and an actual window duration, for receiving a third packet, based on the actual drift. In one or more embodiments, the wireless receiver itself does not comprise a sleep clock, but includes means to receive a sleep clock signal from an external component. The wireless receiver may be part of a system which comprises a microprocessor unit or a microcontroller unit; the calculation engine may be distinct from the microprocessor unit or microcontroller unit such that the wireless receiver may be operable to periodically receive packets without requiring the microcontroller unit or microprocessor unit two exit a low power sleep mode.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program. In other embodiments it may be another language, for instance and without limitation, a compilable language The computer program may be provided on a computer readable medium, which may be a physical computer readable medium, such as a disc or a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in 20 modified and different embodiments

DETAILED DESCRIPTION OF EMBODIMENTS

Figure 1:
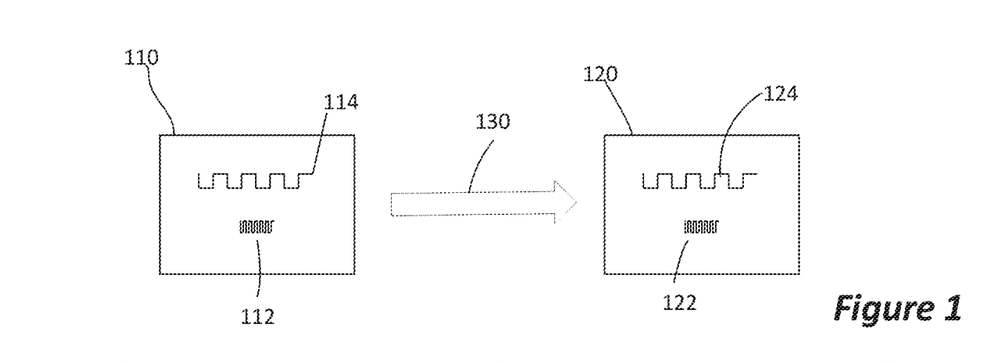
FIG. 1 illustrates two transceivers in a peer-to-peer network.

FIG. 1 illustrates two transceivers in a peer-to-peer network. The transceivers may be termed as an initiator 110 and responder 120, or transmitter 110 and receiver 120, or other suitable names or the application. Each of initiator 110 and responder 120 includes a high precision clock, 112 and 122 respectively, which may be, but it not necessarily, internal to the radio. The transceivers are each configured to operate in a low power mode, in which one or more of the transmitter and receiver may be partially powered down between respectively transmitting or receiving consecutive packets 130. In order to facilitate this the transmitter and receiver each has a second clock, illustrated at hundred 14 and 124 respectively which run at a significantly lower frequency than the high precision clock. For example, the high precision clock typically for BLE may run at a megahertz frequency such as, in a 16-64 MHz range; in contrast the second clock may run at a frequency which is significantly lower, and may be of the order of kilohertz or even hertz, such as 32 kHz, or 32.768 kHz or other convenient frequency in the 10s or 100s of kHz. Since the second clock is operable when the respective transmitter or receiver is partially powered down, it is commonly referred to as a sleep clock. Moreover, as already mentioned in the introduction, such a sleep clock generally may have a lower accuracy than the high frequency precision clock. The sleep clock accuracy, or SCA, affects the timing of events such as wake up, which is the subject matter of the present disclosure.

Figure 2:
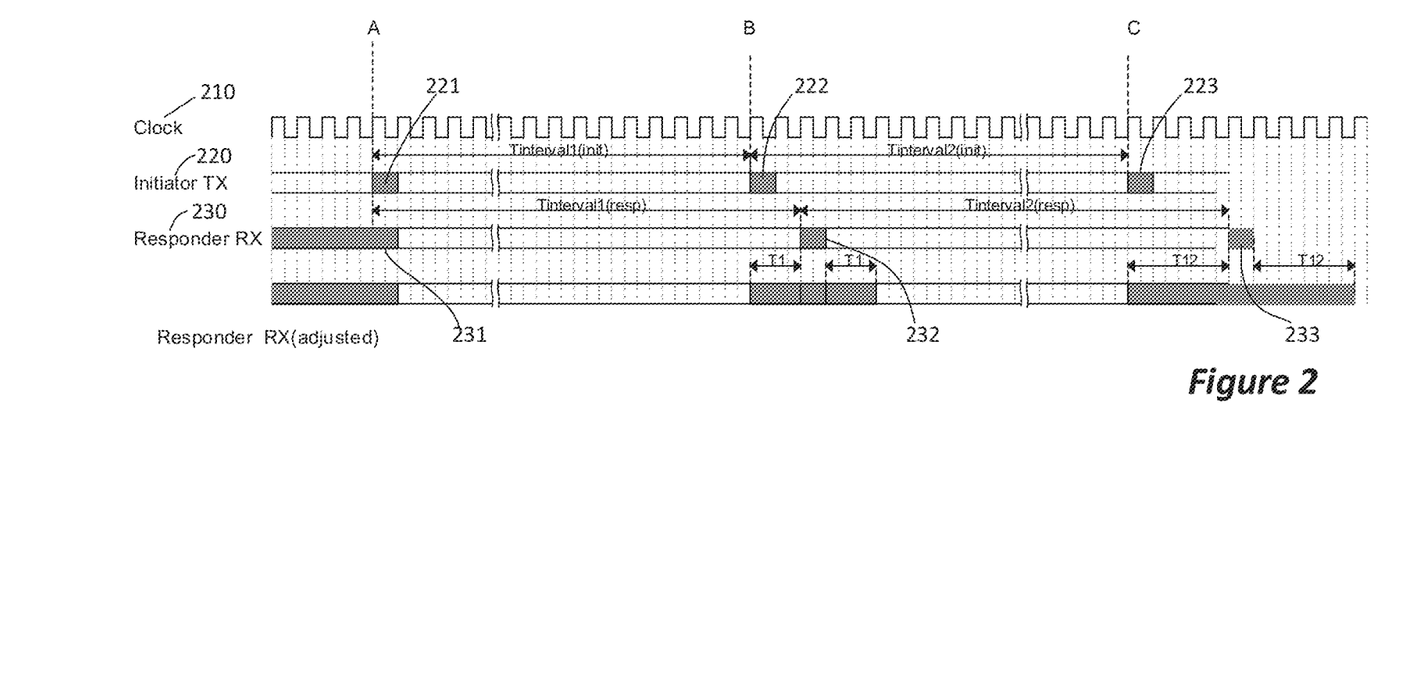
FIG. 2 illustrates the principle of window widening.

FIG. 2 shows a timing diagram of an initiator 220 and responder 230 in which the limitations of the SCA are accommodated, conventionally. The figure shows, at 210, a clock. The clock may be associated with the initiator or the responder, but for definiteness we will assume that the clock in this instance is that of the initiator. At a certain moment, labelled A, the initiator commences transmission of a first packet 221. It should be noted, that although generally hereinunder the first transmission will be referred to as a "packet", the present disclosure is not limited thereto. In particular, since the first transmission is only required to provide an initial time datum, it could be a broadcast signal, control signal, poll message or other appropriate transmission, such as would be familiar to the skilled person. After a certain number, N, of clock cycles, lasting for an interval Tinterval1(init) the initiator commences transmission of a second packet 222. After another interval, Tinterval2(init) from the commencement of the transmission of the second packet, the initiator commences transmission of a third packet, 223. Note that the intervals Tinterval1 and Tinterval2 may have the same duration, under some protocols such as NXP Semiconductor's Wake-On-Radio implementation of stand-alone operation—that is to say, operation which does not require MCU intervention—of Bluetooth low energy (BLE) and other protocols. Alternatively, the intervals Tinterval1 and Tinterval2 may have different durations, such as under IEEE 802.15.4 based on time-slot protocols. It will be appreciated that the intervals Tinterval1 and Tinterval2 are sometimes referred to as an Advertisement Interval. This is a negotiated (or pre-determined) time duration between packets broadcast from a master/initiator device. In the IEEE 802.15.4 protocol, and some other applications, these packets are also called beacons.

The periods of time for which the responder 230 is awake in order to receive packets is also shown. Note that the responder is initially awake and available to receive the first packet, at moment A shown at 231. Since it knows the number of clock cycles N corresponding to Tinterval1, the responder can then go to sleep in order to save power provided it is awake at the end of an interval Tsleep, where Tsleep=Tinterval1−Window (window being the width, or duration of the window.). However, as shown at 231, if the sleep clock of the responder is running slow, relative to the sleep clock of the initiator, the responder will not be woken up ready to receive the second transmitted packet 222 until a later time, as shown at 232. In that case, which corresponds to a positive "sleep clock accuracy" or SCA, the responder would miss the second transmission. In order to avoid this, the responder is woken up early in order to ensure that it is ready to receive the second packets even if its clock is running slow. The sleep clock must awake the responder up early enough to accommodate the "worst case" drift between the two clocks. As shown in FIG. 2, this worst-case drift, which may be termed "drift_set" is given a value T1. However, it is equally possible that the sleep clock of the transponder is running faster relative to that of the initiator, as a result the responder must be programmed to stay awake beyond the nominal expected received time of the second packet 222; once again a worst-case scenario must be accommodated so the responder state awake for a further time duration T1.

The situation is even worse for receipt of a third packet 223: in order to ensure the packet is received, the responder must be awake for even longer (since it should be woken up at a time which a duration T12 prior to the expected arrival—and typically, for example for Wake On Radio, T12 will be twice T1) and remain on for a equivalent time T12 beyond the expected or nominal time for receipt.

Figure 3:
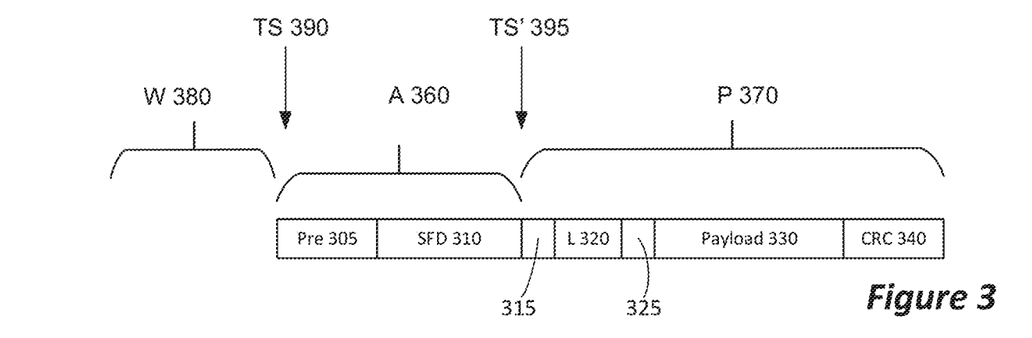
FIG. 3 shows the structure of a typical packet used in peer-to-peer low energy networks.

Before considering how the window widening may be optimised according to the present disclosure, the reader is directed towards FIG. 3 which illustrates a typical packet for a low energy peer-to-peer network. The packet comprises a preamble Pre 305, followed by a start of synchronisation frame delimiter (SFD), also referred to as synchronisation data or synchronisation access address 310. This is followed by a first header H1 shown at 315, and then an indication of the length of the payload, shown at L 320. There then follows another header H1 325 followed by the variable length payload 330. The payload is or may be followed by cyclic redundancy check bit CRC 340. As is clear from the above, the packet can be split into two sections, a first section A 360 comprising the preamble and SFD, and the second section P 370 generally referred to as the payload. It will be appreciated, that although the payload has variable lengths and thus transmission of the payload may take a variable amount of time, this is relatively short compared with the interval between packets, and so the duration of the packet, labelled "Window" in FIGS. 4 and 5, may be considered as a constant in the discussion and calculations which follow.

FIG. 3 further shows a duration W 380 (which would be equivalent to a predetermined fixed number of bytes, depending on the transmission rate) corresponding to a "wake up" period for the transponder. Since, in general, the wake-up period will be finite and non-zero, an instruction to wake up the transponder should be sent at a moment to which precedes the moment at which the responder is to be available for reception by a duration W.

Figure 4:
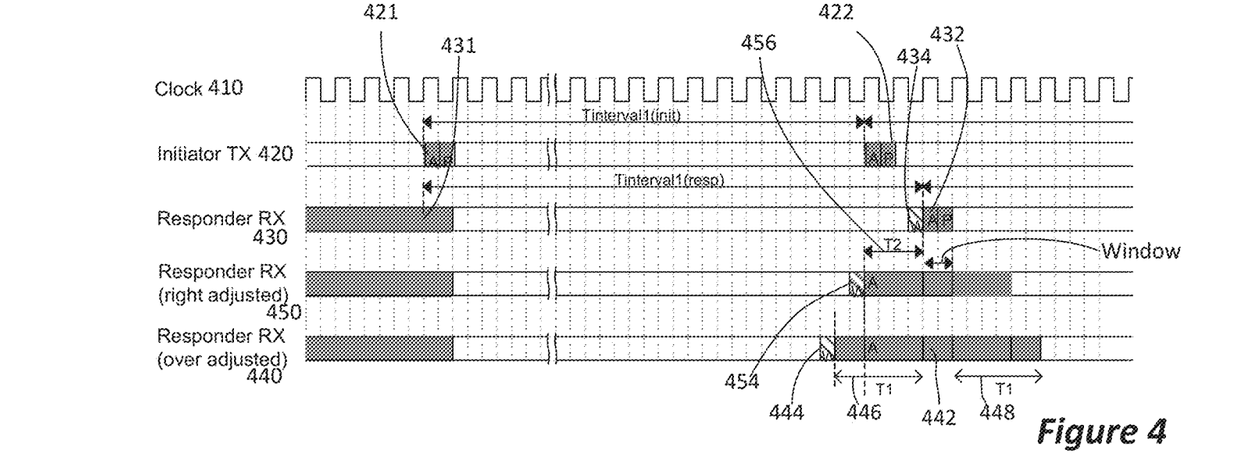
FIG. 4 shows various operational periods of an initiator and responder according to an embodiment of the present disclosure.

Turning now to FIG. 4, this shows a principle of the present disclosure. Similarly to FIG. 2, the diagram shows a clock 410, and an initiator 420 which transmits a first packet 421, followed by a second packet 422 after a period Tinterval1 between the transmissions. The figure also shows a responder configure to receive 430 which is in a receive mode to receive the first packet, shown at 431. The receiver is then configured to at least partially powered down or go to sleep for a period prior to waking up to receive the second packet, having duration "Window". As shown, because in this example the responder's sleep clock is running slow compared to the initiators sleep clock, the moments in time at which the receiver expects to start receiving the second packet 432, that is to say the nominal start moment to stop to receive the packet, is later than that when the packet actually arrives. So "window widening" is required. Furthermore since it would be equally possible that the responder's sleep clock is running fast compared to the initiators sleep clock, the moment in time at which the receiver expects to conclude receiving the second packet 332 could be later than the expected time based on a perfect clock, that is to say the nominal end moment for receiving the second packets. So "window widening" is required to be applied both at the start and end of the window.

First considering the responder configured as the receiver RX 440, in order to ensure that the second packet is received, the window during which the receiver is operable is widened by bringing forward its start time by period T1 446, and extending the operable time by a further period T1 448. As a result the receive window is widened by a factor of two times T1, symmetrically about the expected receive time which is shown as the packet window 442. The extent to which the window must be widened clearly depends on the expected mismatch between the sleep clock of the initiator and the sleep clock of the responder. When multiplied by the number of clock cycles between packets—that is to say the number of clock cycles in Tinterval, the mismatch between the clocks translates to a "drift" in the relative timings. In order to be sure that the window is open when the packet actually arrives, a worst-case scenario should be considered when estimating the drift. The estimation provides a value for T1 of drift_set.

The present inventors have appreciated that once the second packet is received, it is possible to timestamp this arrival time, according to the responders clock, and this provides information on the actual mismatch between the clocks, and an associated drift_real, which can be used for optimising the window widening for subsequent packets. This is (partly) illustrated in the plot 450 of FIG. 4: since the actual draft (drift_real) is less than the worst case drift (drift_set), for subsequent windows, the window does not need to be open for such a long time—rather, it only needs to be extended by T2 456, instead of T1. Furthermore, since now the direction of the drift, in other words whether the responder's sleep clock is running faster or slower than the initiators sleep clock, is known the window widening may be further optimised, as will be considered below with respect to FIG. 5.

As already mentioned, the value of drift_real may be estimated from the actual arrival of the second packet, and in particular, the difference between the moment of actual arrival and the expected arrival according to:

$T2 = \text{drift\_real} * T\text{sleep}$, where $T\text{sleep} = T\text{interval} - (\text{packet duration})$, And since packet duration is small:

$T\text{sleep} \approx T\text{interval}$, so $\text{drift\_real} = T2/T\text{sleep} \approx T2/T\text{interval}$.

Before turning to FIG. 5, to other aspects should be will be described which should be taken into account: first the warm-up period for the responder, and second the timestamp of a received packet. Returning to FIG. 3, firstly, it has already mentioned that the responder's radio may take a finite period to warm up. Thus when considering window widening for receiving packets, it will be appreciated, that in the event that the radio does take a finite time to warm up, commands to switch on the radio should be provided early to the radio. This is illustrated in FIG. 4 by the periods marked W at 434, 444 and 454, which may be termed the warmup period. In general this period will be relatively constant and thus may be accounted for by providing a fixed offset.

Secondly, the time-stamping process of the time arrival of the packet should be considered. In general, and in particular for present purposes, the timestamp of a packet refers to the moment at which the start of the packet is received, shown as TS 390 in FIG. 3. However, this is not, typically, directly measurable, rather it is calculated: the skilled person will appreciate that the typical packet comprises a preamble and start of frame data or other synchronisation bits or bytes. Depending on the protocol used, this information may be used to identify that the packet received is intended for the responder, which typically is carried out at the so-called "link-layer" of Media Access Control (MAC) layer. Only at the end of receipt of this part of the packet, labelled A 360 above is it possible to accurately timestamp the packet. Thus in practice what is directly measured is the moment 395 being the end of the SFD 310 and the commencement of the payload P 370 part of the packet. This is shown in FIG. 3 as moments TS' 395. Where the number of bytes in, and thus the durations of, the SFD 310 part of the packet and the preamble 305 are both known and constant or fixed between packets, it is possible to calculate the true timestamp 390 from the directly measured time 395. This is typically the case, for receivers which are intended to receive packets under one protocol. However, the present disclosure extends to receivers which are intended and capable of receiving packets according to different protocols. In such embodiments in which the receiver does not know in advance, or a priori, the duration of the SFD 310 and the preamble 305, an estimate, or calculation, may be needed to determine this.

Figure 5:
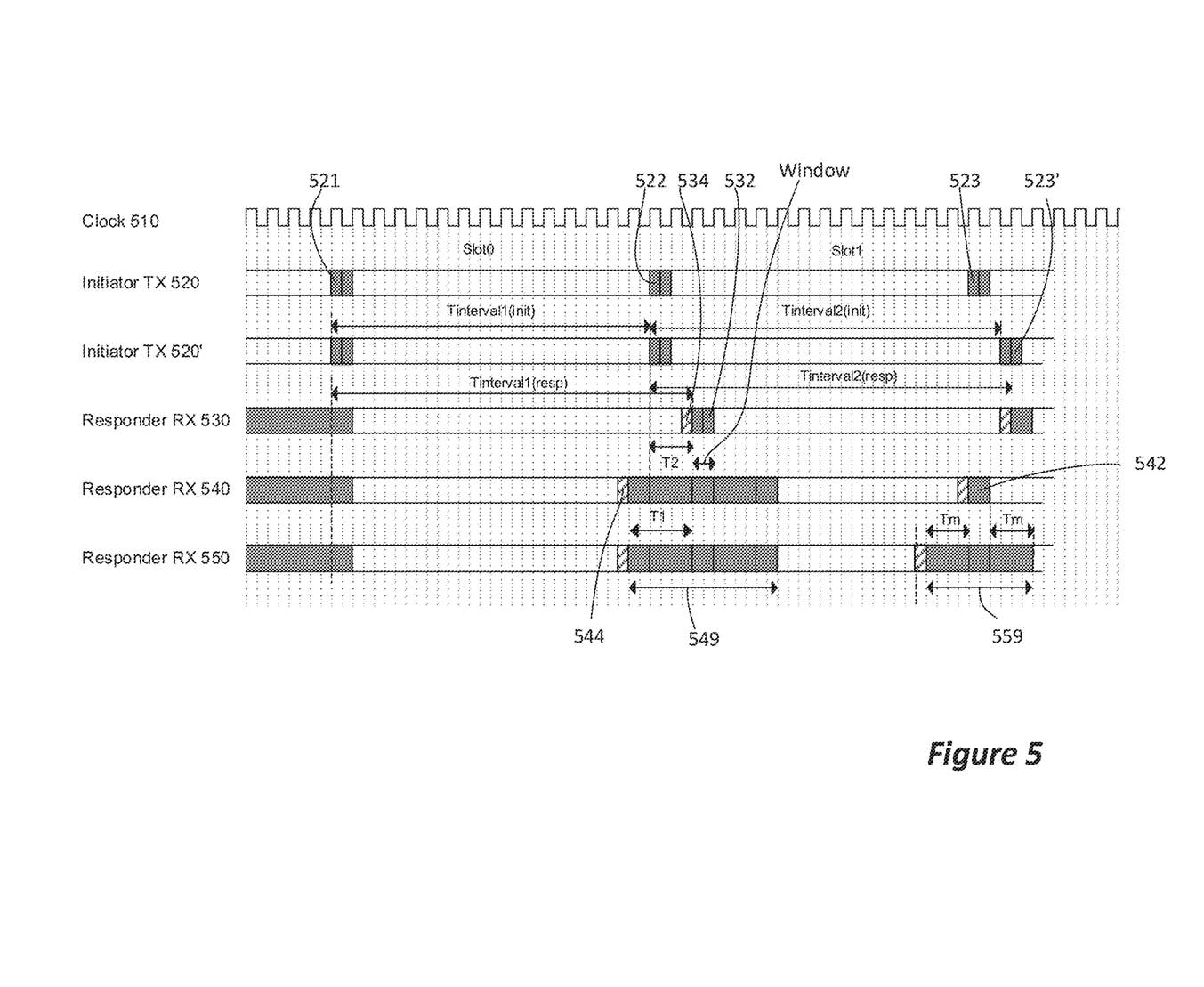
FIG. 5 shows various other operational periods of an initiator and responder according to one or more further embodiments of the present disclosure.

Turning now to FIG. 5, this shows various possible windows for the receiver to receive both the first and second packets, and subsequently a third packet. As in FIG. 4, the figure also shows a block 510, which may be for instance the initiator sleep clock. The figure shows the initiator TX 520 transmitting first, second and third packets 521, 522 and 523 in respective windows, that well-defined intervals tea interval. In this particular example the interval Tinterval1 between first and second packet is the same as that, Tinterval2, between the second and third packets, although in other embodiments the intervals may be different. In any case, the interval before between any two packets is known a priori by the responder. Below the illustration of initiator transmitting at 520, is shown another plot 520' illustrating the impact of variable drift in the initiators clock: the initiator clock during the slot between the second and third packet is running slow relative to the baseline clock resulting in the packet being transmitted later than would be expected according to an absolute clock. This source of timing error will be considered further hereinbelow.

Turning now to the responder in receive mode, at 530 is shown the expected or nominal time for the responder to receive the second packet, at 532, the packet having a width in the figure corresponding to a duration "Window". Again as discussed above, the nominal window is preceded by a warmup period 534. In this illustrative example, the responder clock is running slow relative to the initiator clock such that the interval Tinterval1(resp) is greater than the interval Tinterval1(init), measured against either a notional absolute clock or the initiator's clock. Also shown is the nominal period nominal window in which the responder would expect to receive the third packet, based on its clock, that is to say, after a period Tinterval2(resp).

At both 540 and 550 are shown the responder having been woken up in time to receive the second packet, taking into account the worst-case estimated drift between the clocks. As discussed above, the responder is woken up in time to allow for a drift of drift_set—that is to say the responder is woken up such that it is ready to receive, at a time which is an interval or duration T1 prior to the expected received time where T1 equals drift_set. The responder is then awake for a total time corresponding to the packet window plus twice the drift_set interval T1, as shown at 549. Again as discussed above, the command to wake up precedes the time at which the responder needs to be able to receive by a warmup period shown at 544. Although the responder is ready to receive atom moments which is T1 prior to the expected arrival time, in fact the packet start to arrive at a moment which is, as shown at 540, prior to the expected arrival by an interval T2, less than T2. The responder timestamp the arrival of the packets as described above, and uses this information in order to optimise the operating window for receiving the third packet. 540 shows the idealised case: from the value of T2, determined from the time difference expected (or nominal) start of the packet window and the actual timestamp, the responder now knows the relative drift between the clocks over the interval Tinterval1. As a result, it can precisely calculate the planned arrival time of the third packet: in the event that the time between packets, Tinterval1 and Tinterval2, are the 35 same, it merely subtracts the measured drift from the expected packet arrival time to derive the planned arrival time; in the alternative case where intervals between packets are variable, it calculates the expected drift during the second interval Tinterval2 based on the ratio of intervals Tinterval2 and Tinterval1, multiplied by the measured drift during interval T1. For the ideal case, the window is now perfectly aligned with the planned 5 arrival time from the initiator of the third packet 523.

However, again as discussed above, in real practical situations, the drift may vary over time either because of changes affecting the initiator's clock or the responder's clock, for instance because of changes in the operating conditions, such as temperature, power source stability or operating voltage etc. The responder must be able to accommodate this variability in drift. In order to do so, the responder applies a margin of error Tmargin, shown in FIG. 5 as Tm. Furthermore, unlike the drift itself, which, at any instant is generally only one of positive and negative, and which it is—positive or negative—is evident by the timestamp of the second packet, the variability on the drift may be either positive or negative. So the margin must be applied to both the expected start of receipt of packet, and the expected end of the packet. In consequence the packet window for receiving the third packet is widened in total by a duration of 2×Tmargin. This widening is generally symmetrical about the planned time. Since the variability in the drift can generally be considered to be much less than the drift itself, the value for Tmargin can be significantly smaller than the value of drift_set. As a result the responder need only be awake and fully operational for a considerably shorter period, shown at 559, than would be the case for conventional window widening based on the worst-case estimates of drift (as shown at 549). Depending on the precision of the clocks, Tmargin could even be set to zero. Put another way, according to the optimised window widening, the responder is operational for an interval 559 corresponding to the packet window plus twice the margin Tmargin, which is considerably less than the conventional window widening, for which the duration 549 is the packet window plus twice the worst-case expected drift drift_set.

Figure 6:
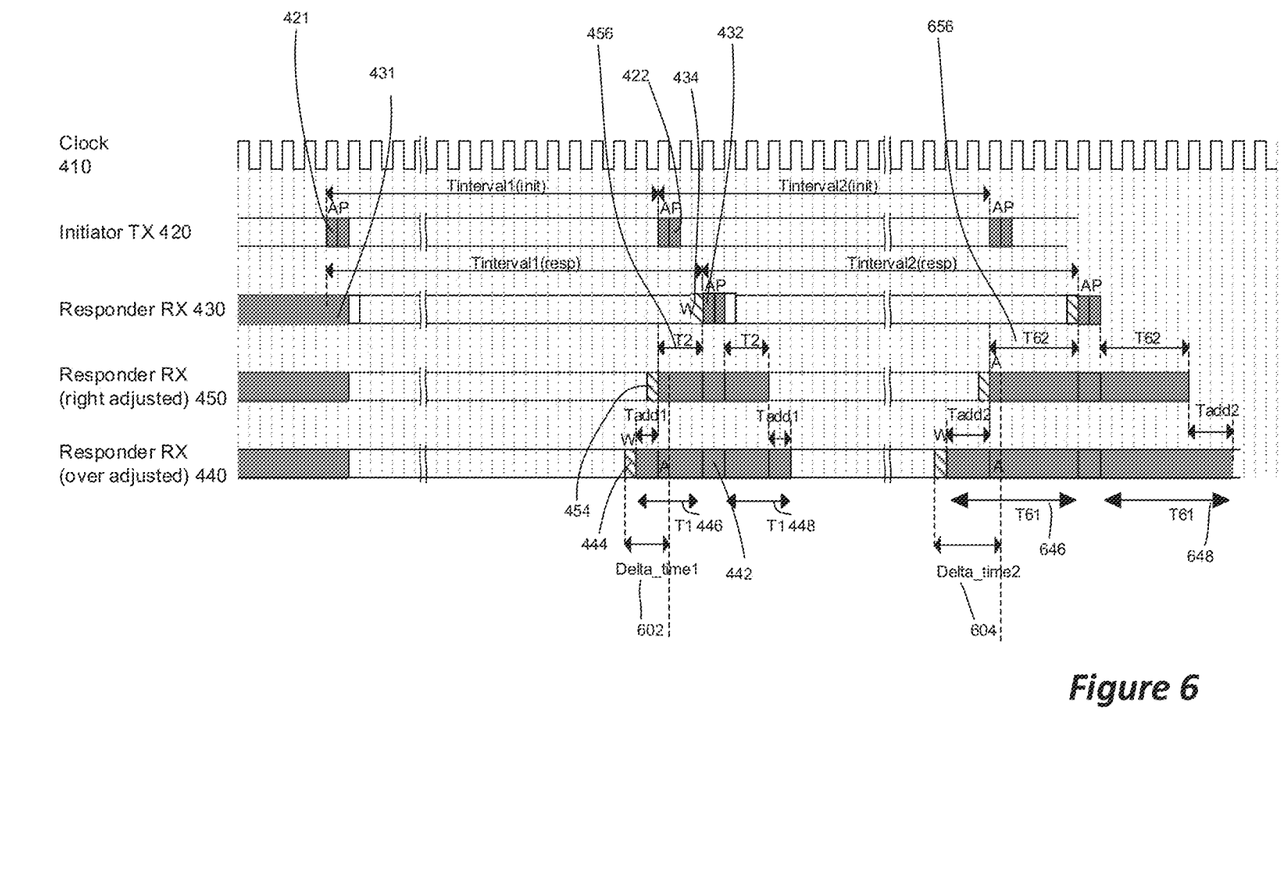
FIG. 6 shows various operational periods of an initiator and responder according to one or more embodiments of the present disclosure.

Turning now to FIG. 6, this figure shows various operational periods of an initiator and responder according to one or more embodiments of the present disclosure. This figure shows the clocks according to that shown in FIG. 4, and so corresponding reference signs are used to refer to corresponding features. However, in this instance two packets are timestamped (referred to here as the "second" and "third" packet since the first packet is that received at 431 and providing the baseline for the timings). As shown, assuming constant drift, this results in the packets arriving "early" (that is to say, as measured by the responder's clock), by time intervals 456 T2 and 656 T62. In the case of the time intervals between packets being constant the time interval T62 is simply 2×T2. The skilled person will appreciate that for non-constants intervals between tap packets, the third packet arrives early—beyond the early arrival of the second packet by an additional length of time which scales with the time intervals between packets That is to say, the magnitude of interval 656 is:

$$T62 = T2 \times (1 + (Tinterval2/Tinterval1)).$$

In this instance, the radio is turned on according to the "worst case" drift situation (using drift_set as discussed above) for both the second and third (which, in this case, may be considered as a "further") packet, leading to a significantly longer operating period for receiving the third or further packet. This is shown in the lowermost plot showing the radios being turned on and ready to operate at a moment which is ahead of the expected arrival time of the packet by an interval T1 446 for the second packet, and an interval T61 646 for the third or further packet. In the case that the packets are expected to be evenly spaced (such that Tinterval1(init)=Tinterval2(init), it is trivial to show that T 61 should be twice T1. Furthermore, the skilled person will appreciate that for non-constants intervals between packets, the—additional—early actual arrival of the second packet will be proportionate scale with the time interval. That is to say, the magnitude of interval 656 is:

$$T61 = T1 \times (1 + (Tinterval2/Tinterval1)).$$

In real-world situations, it may be more convenient to measure a value of "Delta time", shown as Delta_time1 602 for the first packet and Delta_time 2 604 for the second packet in FIG. 6. This is a direct measurement, using responder's clock, between the start of the actual warmup time, and the timestamp moment TS' 395 expected, (according to the initiator clock).

So, referring again to FIG. 6:

$$\text{Delta\_time} = Tdly + (\text{adjust\_set} - \text{adjust\_real}),$$

where Tdly is an offset resulting from one or both of the warm-up time and the duration "A" of the sfd and preamble in the packet. So, $$\text{Delta\_time} = Tdly + Tsleep^*(\text{drift\_set} - \text{drift\_real}).$$

Apply this for a "first-to second" interval and a "first to third (or further)" group of two intervals gives:

$$\text{Delta\_time1} = Tdly + Tsleep1^*(\text{drift\_set} - \text{drift\_real})$$

$$\text{Delta\_time2} = Tdly + Tsleep2^*(\text{drift\_set} - \text{drift\_real})$$

and subtracting the two removes any offset due to Tdly:

$$\text{Delta\_time2} - \text{Delta\_time1} = (Tsleep2 - Tsleep1)^* (\text{drift\_set} - \text{drift\_real}),$$

From which it follows that:

$$\text{drift\_real} = \text{drift\_set} - (\text{Delta\_time2} - \text{Delta\_time1}) / (Tsleep2 - sleep1),$$

which approximates to:

$$\text{drift\_real} = \text{drift\_set} - (\text{Delta\_time2} - \text{Delta\_time1}) / (Tinterval).$$

Thus, in such embodiments, the method includes measuring a start moment of the received second packet within the widened window to determine a first offset, Delta_time1; from the respective start moment or synchronization time reference, and an expected interval between packets, Tinterval, determining a nominal start moment to start the radio for a packet window, Window, until a nominal end moment, for receiving a further packet immediately subsequent the second packet, and extending a further packet window duration in dependence on an estimated drift, drift_set, based on the SCA to provide a further packet widened window; measuring a start moment of the received further packet within the further packet widened window to determine a second offset, Delta_time2; wherein calculating, from the start moment of the second packet, an actual drift, drift_real comprises dividing the difference, between the second offset and the first offset, Delta_time2–Delta_time1, by the expect interval between packets, Tinterval, and determining an actual start moment to start the radio and an actual window duration, for receiving a subsequent packet, based on the actual drift.

The skilled person will be aware that in real world applications, it is possible to miss packets. Packets may be missed or skipped for instance due to interference such as an obstacle temporarily obstructing the responder from the transmitter, or other reasons. Practical implementations need to be able to accommodate missed or skipped packets. Missed or skipped packets fall into two categories: the first case is where the responder fails to receive the second packet. In this instance the responder has no information on which to optimise the packet widening, and the window for the third packet should be broadened widened at both its start and finish by two times drift_set (for an expected third packet) three times drift_set for expected fourth packet in the event that both the second and third packets are missed or skipped, and so on. This is no improvement on conventional window widening. However in the instance that the second packet has been received such that the responder has been able to calculate the drift_real to optimise the packet widening for the third packet, then should this packet be missed or skipped, then the window start and finish need be widened for the expected fourth packet only by twice Tmargin, and (in the event that the third and fourth packet are both skipped or missed) by three times Tmargin for the fifth packet. Since the widening is symmetrical and on both sides of the window, the total window widening in the event of skipping N packets can readily be shown to be: 2×(N+1)×Tmargin.

Of course, the skilled person will be aware that if too many packets are skipped, it may be possible that a timing error or other event has occurred. In this event it may be appropriate to reset the responder. The responder may thus be programmed to undergo a reset in the event that a predetermined number of packets are skipped or missed. In other words, after a predetermined duration, should know packet have been received, it may be appropriate to reset the responder. Put another way, communication between two wireless nodes may have failed If a large number of back-to-back packets are missed. This failure condition might be forced using a timeout feature or by maintaining a count of the missed packet reception slots, i.e., a failure is indicated if the number of missed packet ("Missed_Number") reaches to a predetermined number. In such a case, it might be unreliable to try to continue the auto-drift tracking as discussed above. Based on the chosen failure criterion, a fail_interrupt could be generated, which could wake-up the MCU or Host processor to reset the responder's Radio. The predetermined count of missed packets to generate a timeout may be implemented as a programmable register, which can be chosen based on the characteristics (such as ambient conditions or application requirements) of a wireless deployment. "Missed_Number" could be implemented as an internal register which increases by 1 when a packet is missed, and is reset to 0 when a packet is successfully received.

The skilled person will appreciate that, and it should be noted that the drift calculation may be implemented in hardware, or it may be implemented in software using computation resources available in a connected microprocessor unit, MCU (i.e., MCU+radio). This also readily facilitates the case of time-slotted mode, since in this case the expected duration for each time-slot is different and may need to handled accordingly, which could easily become quite complex to implement in hardware.

In such as case, for instance, may be implemented as follows:

the hardware stores the relevant data (packet timestamps, etc.) in the registers and informs the software to perform calculations through radio generated interrupts.

the software performs the drift calculations and stores the calculation result in the hardware drift register.

the hardware obtains the calculated value of drift from the register and applies it to the next slot.

Software calculation offers advantages of is improved flexibility and potentially better accuracy (due to floating point calculations). Conversely, the radio would need to wake up the CPU, which might have a power penalty. The selection of, and boundaries between, hardware and software will clearly be implementation-specific.

In order to aid the understanding of the present disclosure, in the above discussion of FIG. 2 and following, it has been assumed that there is a single clock operating in each of the initiator and the responder, throughout the packet transmission. In practice, again as the skilled person will be aware and was briefly discussed with respect to FIG. 1, the devices typically will have two clocks. During active operation, the device will be controlled by a relatively high precision, high frequency clock—also sometimes referred to as "running clock", whilst during the low-power or partially powered-down intervals, the device will be controlled by the low frequency clock. Implementation of the optimisation of window widening should generally be able to accommodate the transition between the low frequency clock and the high precision high frequency clock, since during the reception of the packets, and subsequent processing such as parsing or decoding the packets, in most implementations the responder will require to be fully operational and thus under the control of the high-frequency high precision clock.

From the above description, the skilled person will appreciate that optimising the window widening for the responder may be carried out using relatively low-level processing. Processes discussed herein may therefore be appropriate for use in a link layer, or MAC, implementation within the radio transceiver; they may also be appropriate for use in applications in which it is undesired to switch on a processor such as an MCU external to the radio to calculate the window widening. An example would be a processor-less scheduled autonomous low-level communication engine, such as NXP's Wake on Radio (WOR) engine, which only wakes the link layer, or higher levels layers of communication stack upon a successful communication.

From reading the present disclosure, other variations and modifications will be apparent to the skilled person. Such variations and modifications may involve equivalent and other features which are already known in the art of low power networks, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. A method of operating a wireless receiver having a mode in which a radio is configured to periodically operate in a receive mode during receive intervals with a sleep interval (Tsleep) between receive intervals, the radio comprising a sleep clock having a sleep clock accuracy (SCA), the method comprising:

receiving a first packet having one of a start moment and a synchronization time reference;

from an expected interval between packets (Tinterval) and the one of the start moment and the synchronization time reference, determining a nominal start moment to start the radio for a packet window (Window) until a nominal end moment for receiving a second packet;

extending a packet window duration in dependence on an estimated drift (drift_set) based on the SCA to provide a widened window;

receiving the second packet;

measuring a start moment of the second received packet within the widened window to determine a first offset (Delta_time1) from the expected interval between packets (Tinterval) and the one of the start moment and the synchronization time reference;

calculating, from the start moment of the second packet, an actual drift (drift_real);

determining, based on the actual drift, an actual start moment to start the radio and an actual window duration for receiving a third packet;

determining a nominal start moment to start the radio for a packet window (Window) until a nominal end moment for receiving the third packet;

extending the actual window duration for receiving the third packet in dependence on the estimated drift (drift_set) based on the SCA to provide a third packet widened window;

receiving the third packet;

measuring a start moment of the received third packet within the third packet widened window to determine a second offset (Delta_time2);

calculating, from the start moment of the third packet, an updated actual drift (drift_real) by dividing a difference between the second offset (Delta_time2) and the first offset (Delta_time 1) by the expected interval between packets (Tinterval); and determining an actual start moment to start the radio and an actual window duration for receiving a fourth packet based on the updated actual drift.

2. The method of claim 1, wherein the actual window duration for receiving the third packet is extended from the packet window by a predetermined margin (Tmargin).

3. The method of claim 2, wherein the actual start moment to start the radio for receiving the third packet is earlier, by a predetermined margin, than a start moment determined based on the actual drift, and the actual window duration for receiving the third packet is extended from the packet window by twice the predetermined margin.

4. The method of claim 3, wherein the actual moment to start the radio for receiving the third packet (Trxen3) is determined relative to an actual arrival moment of the second packet (Tarrive2) by:

Trxen3=Tarrive2+Tinterval+(Tsleep*drift_real)−Tmargin.

5. The method of claim 3, wherein the actual window duration for receiving the third packet (Window_real) is determined by:

Window_real=Window+2*Tmargin.

6. The method of claim 3, wherein the third packet is not received, the method further comprising determining, for receiving a subsequent (N+2)th packet, an actual start moment Trxen(N) to start the radio, based on N times the expected interval between packets less N times the actual drift and N times the predetermined margin, according to:

Trxen(N)=Tarrive2+N*(Tinterval+(Tsleep*drift_real)−Tmargin).

7. The method of claim 6, the method further comprising determining, for receiving the (N+2)th packet, and an actual window duration of Window_real=Window+2*N*Tmargin.

8. The method according to claim 1, further comprising, to start the radio, waking up the radio at a moment which precedes the start moment by pre-determined warm-up interval.

9. The method of claim 8, wherein the expected internal between packets, Tinterval, is variable; wherein the expected interval between the second and third packet is given by Tinterval2, and wherein the actual moment to start the radio for receiving the third packet is determined relative to an actual arrival moment of the second packet, Tarrive2, by:

Trxen3=Tarrive2+Tinterval2+(Tsleep2*drift_real)−Tmargin.

10. The method of claim 9, wherein the actual window duration, Window_real, is determined by:

Window_real=Window+2*Tmargin.

11. A wireless receiver comprising:
a sleep clock having a sleep clock accuracy (SCA);
a radio configured to periodically operate in a receive mode during a receive interval and to have sleep intervals (Tsleep) between receive intervals;
a calculation engine configured to:
  determine, based on a start moment of a first received packet and an expected interval between packets (Tinterval), a nominal start moment to start the radio for a packet window (Window) until a nominal end moment for receiving a second packet;
  determine a widened window by extending the packet window duration in dependence on an estimated drift (drift_set) based on the SCA; and
a clock circuit configured to measure a start moment of the second received packet within the widened window and a start moment of a third received packet within a third packet widened window;
wherein the calculation engine is further configured to:
  determine a first offset (Delta_time1) from the start moment of the first received packet and the expected interval between packets (Tinterval);
  calculate, from the start moment of the second packet, an actual drift (drift_real);
  determine, based on the actual drift, an actual start moment to start the radio and an actual window duration for receiving the third packet;
  determine a nominal start moment to start the radio for a packet window (Window) until a nominal end moment for receiving the third packet;
  extend the actual window duration for receiving the third packet in dependence on the estimated drift (drift_set) based on the SCA to provide the third packet widened window;
  measure a start moment of the received third packet within the third packet widened window to determine a second offset (Delta_time2);
  calculate, from the start moment of the third packet, an updated actual drift (drift_real) by dividing a difference between the second offset (Delta_time2) and the first offset (Delta_time 1) by the expected interval between packets (Tinterval); and
  determine an actual start moment to start the radio and an actual window duration for receiving a fourth packet based on the updated actual drift.

12. The wireless receiver of claim 11, wherein the actual window duration for receiving the third packet is extended from the packet window by a predetermined margin (Tmargin).

13. The wireless receiver of claim 11, wherein the actual start moment to start the radio for receiving the third packet is earlier, by a predetermined margin, than that based on the actual drift, and wherein the actual window duration is extended from the packet window by twice the predetermined margin.

14. A non-transitory computer-readable medium storing machine instructions which, when executed by at least one processor, cause the at least one processor to:
receive a first packet having one of a start moment and a synchronization time reference;
determine, from an expected interval between packets (Tinterval) and the one of the start moment and the synchronization time reference, a nominal start moment to start a radio for a packet window (Window) until a nominal end moment for receiving a second packet;
extend a packet window duration in dependence on an estimated drift (drift_set) based on a sleep clock accuracy (SCA) of a sleep clock in the radio to provide a widened window;
receive the second packet;
measure a start moment of the second received packet within the widened window to determine a first offset (Delta_time1) from the expected interval between packets (Tinterval) and the one of the start moment and the synchronization time reference;
calculate, from the start moment of the second packet, an actual drift (drift_real);
determine, based on the actual drift, an actual start moment to start the radio and an actual window duration for receiving a third packet;
determine a nominal start moment to start the radio for a packet window (Window) until a nominal end moment for receiving the third packet;

extend the actual window duration for receiving the third packet in dependence on the estimated drift (drift_set) based on the SCA to provide a third packet widened window;

receive the third packet;

measure a start moment of the received third packet within the third packet widened window to determine a second offset (Delta_time2);

calculate, from the start moment of the third packet, an updated actual drift (drift_real) by dividing a difference between the second offset (Delta_time2) and the first offset (Delta_time 1) by the expected interval between packets (Tinterval); and determine an actual start moment to start the radio and an actual window duration for receiving a fourth packet based on the updated actual drift.

\* \* \* \* \*